(12) United States Patent
Schwager et al.

(10) Patent No.: US 11,347,276 B2
(45) Date of Patent: May 31, 2022

(54) CABLE ROUTING IN A PORTABLE INFORMATION HANDLING SYSTEM

(71) Applicant: Dell Products L.P., Round Rock, TX (US)

(72) Inventors: Mark Andrew Schwager, Cedar Park, TX (US); Yu-Feng Huang, Hsin-Chu (TW); Kai-Yuan Cheng, Taipei (TW); Nicholas G. DiLoreto, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 17/079,819

(22) Filed: Oct. 26, 2020

(65) Prior Publication Data

US 2022/0129047 A1    Apr. 28, 2022

(51) Int. Cl.
*G06F 1/16* (2006.01)
*E05D 11/00* (2006.01)

(52) U.S. Cl.
CPC ........ *G06F 1/1683* (2013.01); *E05D 11/0081* (2013.01); *G06F 1/1616* (2013.01); *E05Y 2900/606* (2013.01)

(58) Field of Classification Search
CPC combination set(s) only.
See application file for complete search history.

(56) References Cited

U.S. PATENT DOCUMENTS

| 4,802,605 | A  | * | 2/1989  | Salmon ................. | G06F 1/1683 220/843 |
| 4,959,887 | A  | * | 10/1990 | Gruenberg ............ | G06F 1/1616 16/223 |
| 5,278,725 | A  | * | 1/1994  | Konno ................. | G06F 1/1683 439/165 |
| 5,751,544 | A  | * | 5/1998  | Song ..................... | G06F 1/1681 439/165 |
| 6,449,149 | B1 | * | 9/2002  | Ohashi ................... | G06F 1/203 174/15.2 |
| 7,379,292 | B2 | * | 5/2008  | Tsai ....................... | G06F 1/1616 361/679.27 |
| 7,787,242 | B2 | * | 8/2010  | Schwager .............. | G06F 1/162 361/679.28 |

(Continued)

*Primary Examiner* — Lisa Lea-Edmonds
(74) *Attorney, Agent, or Firm* — Terrile, Cannatti & Chambers; Stephen A. Terrile

(57) ABSTRACT

A portable information handing system. The portable information handling system includes a base chassis, the base chassis comprising a motherboard, the motherboard comprising a processor and a bus coupled to the processor, the base chassis portion comprising a cable routing bracket; a display chassis, the display chassis being rotationally-coupled to the base chassis via a hinge, the hinge having a corresponding hinge axis, the display chassis comprising a display chassis component; and, a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated.

14 Claims, 13 Drawing Sheets

(56) References Cited

U.S. PATENT DOCUMENTS

| | | | | |
|---|---|---|---|---|
| 8,058,553 B2* | 11/2011 | Saito | .................... | G06F 1/1616 |
| | | | | 361/679.26 |
| 8,385,053 B2* | 2/2013 | Shirasaka | ............. | G06F 1/1656 |
| | | | | 361/679.01 |
| 8,576,136 B2* | 11/2013 | Camacho | ............. | G06F 1/1698 |
| | | | | 343/702 |
| 8,593,800 B2* | 11/2013 | Asakura | ................ | G06F 1/1683 |
| | | | | 361/679.28 |
| 9,507,388 B1* | 11/2016 | Hampton | ............. | G06F 1/1681 |
| 9,535,465 B2* | 1/2017 | Bohn | .................... | G06F 1/1681 |
| 9,658,654 B1* | 5/2017 | Wu | ....................... | G06F 1/1683 |
| 9,857,834 B2* | 1/2018 | Hampton | ............. | G06F 1/1637 |
| 9,891,672 B2* | 2/2018 | Hampton | ............. | G06F 1/1681 |
| 10,019,040 B2* | 7/2018 | Wu | ....................... | G06F 1/1683 |
| 10,203,731 B1* | 2/2019 | Brocklesby | ........... | G06F 1/1683 |
| 10,760,311 B2* | 9/2020 | Regimbal | ............ | G06F 1/1683 |
| 2007/0058331 A1* | 3/2007 | Schwager | ............ | G06F 1/1683 |
| | | | | 248/917 |
| 2010/0238621 A1* | 9/2010 | Tracy | .................... | G06F 1/1698 |
| | | | | 264/272.11 |
| 2012/0014083 A1* | 1/2012 | Saito | .................... | G06F 1/1616 |
| | | | | 361/807 |
| 2017/0097657 A1* | 4/2017 | Hampton | ................ | F16C 11/12 |
| 2017/0255235 A1* | 9/2017 | Wu | ....................... | G06F 1/1683 |
| 2017/0300089 A1* | 10/2017 | Hampton | ............. | G06F 1/1683 |
| 2019/0128533 A1* | 5/2019 | Bunzel | .................. | H02G 11/00 |
| 2019/0169896 A1* | 6/2019 | Regimbal | ................ | E05D 7/04 |
| 2020/0362608 A1* | 11/2020 | Regimbal | ............. | G06F 1/1683 |

* cited by examiner

CABLE ROUTING IN A PORTABLE INFORMATION HANDLING SYSTEM

BACKGROUND OF THE INVENTION

Field of the Invention

The present invention relates to information handling systems. More specifically, embodiments of the invention relate to cable routing in a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a portable information handing system, comprising: a base chassis portion, the base chassis portion comprising a motherboard, the base chassis portion comprising a cable routing bracket; a display chassis portion, the display chassis portion being rotationally-coupled to the base chassis portion via a hinge, the hinge having a corresponding hinge axis, the display chassis portion comprising a display chassis component; and, a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated.

In another embodiment the invention relates to an information handling system comprising: a base chassis, the base chassis comprising a motherboard, the motherboard comprising a processor and a bus coupled to the processor, the base chassis portion comprising a cable routing bracket; a display chassis, the display chassis being rotationally-coupled to the base chassis via a hinge, the hinge having a corresponding hinge axis, the display chassis comprising a display chassis component; and, a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated.

In another embodiment the invention relates to a cable routing bracket, comprising: a cable routing portion, the cable routing portion routing a cable from a base chassis of an information handling system to a display chassis of an information handling system, the base chassis and the display chassis being rotationally-coupled via a hinge, the cable routing portion causing the cable to pivot about the hinge axis of the hinge when the display chassis is rotated about the hinge.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
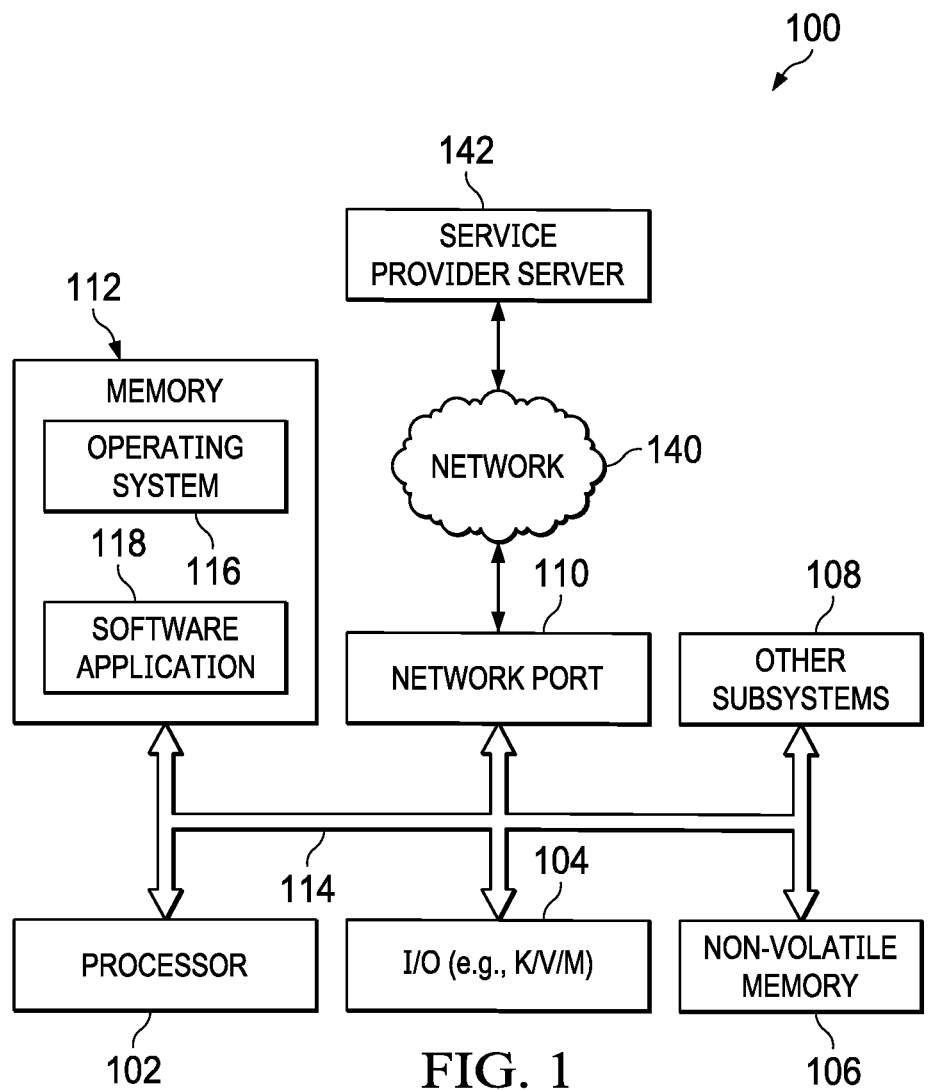
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
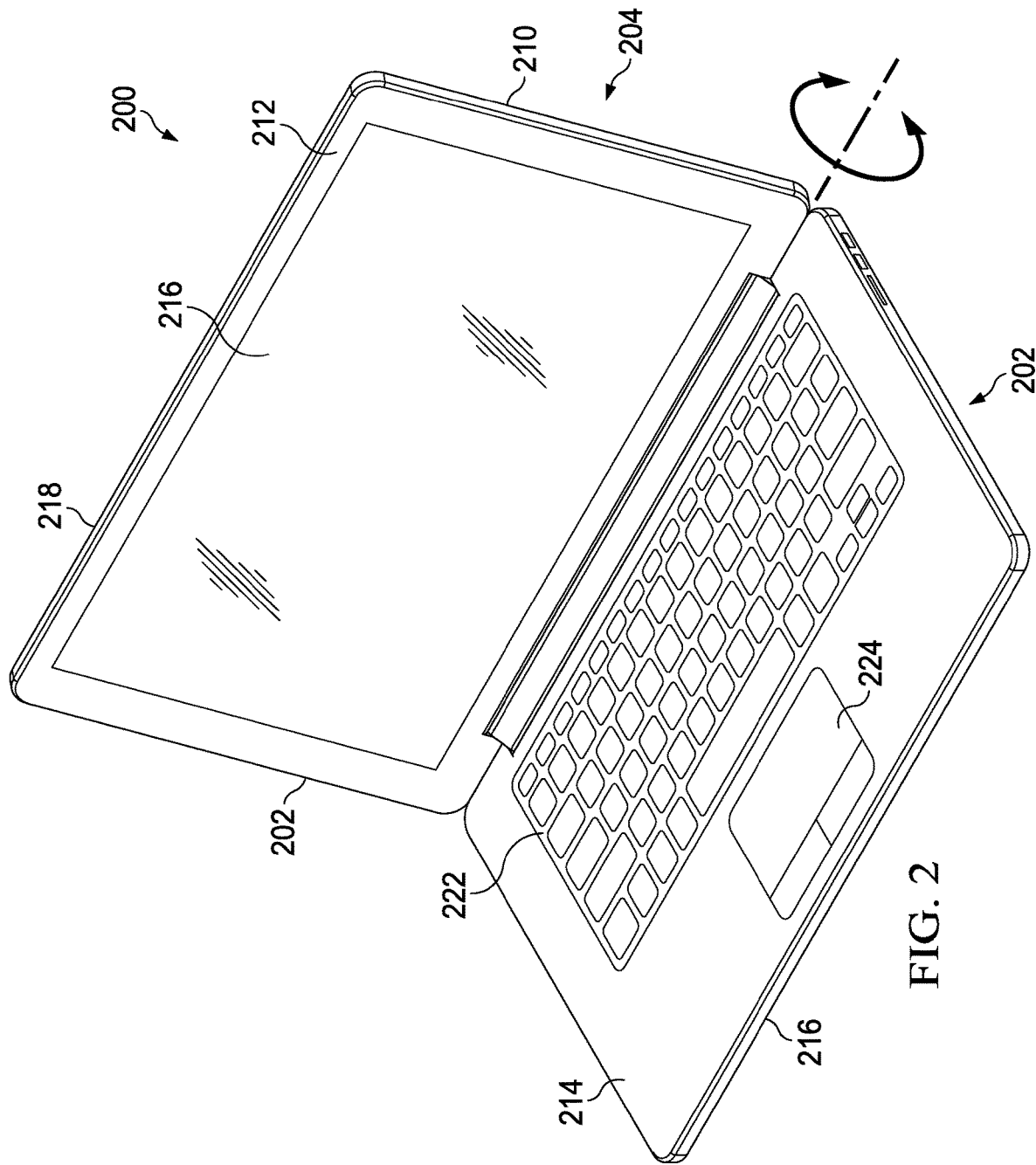
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the C-cover 204 via one or more hinges. In this configuration, the hinges allow the A-cover 202 to rotate from and to the C-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the C-cover 204, for example up to 180° rotation arc. In other embodiments the information handling system 200 may be a convertible information handling system with full rotation to a tablet configuration. It will be appreciated that in other embodiments, the A-Cover could attach to the B-Cover of the D-Cover.

Figure 3:
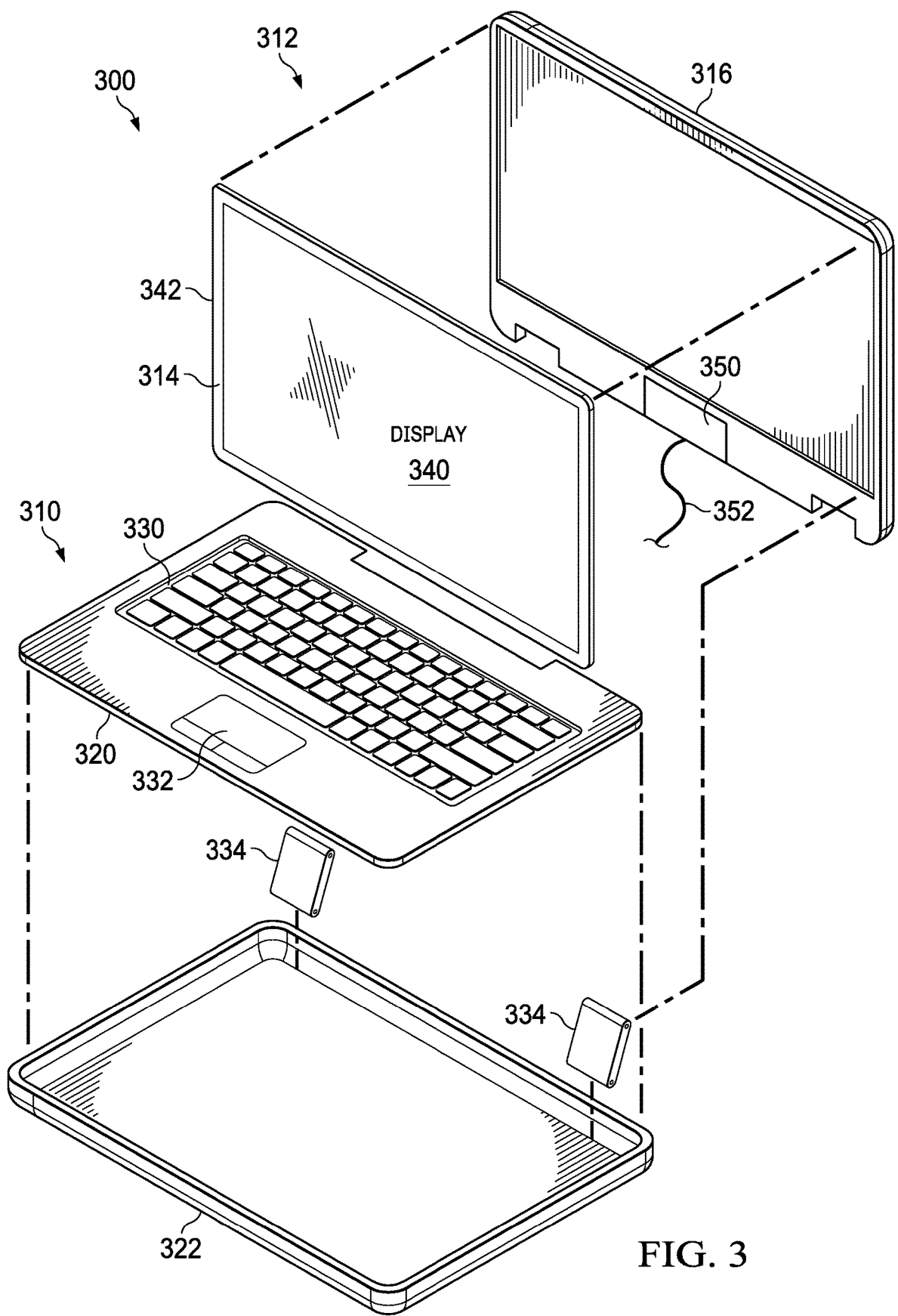
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown).

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
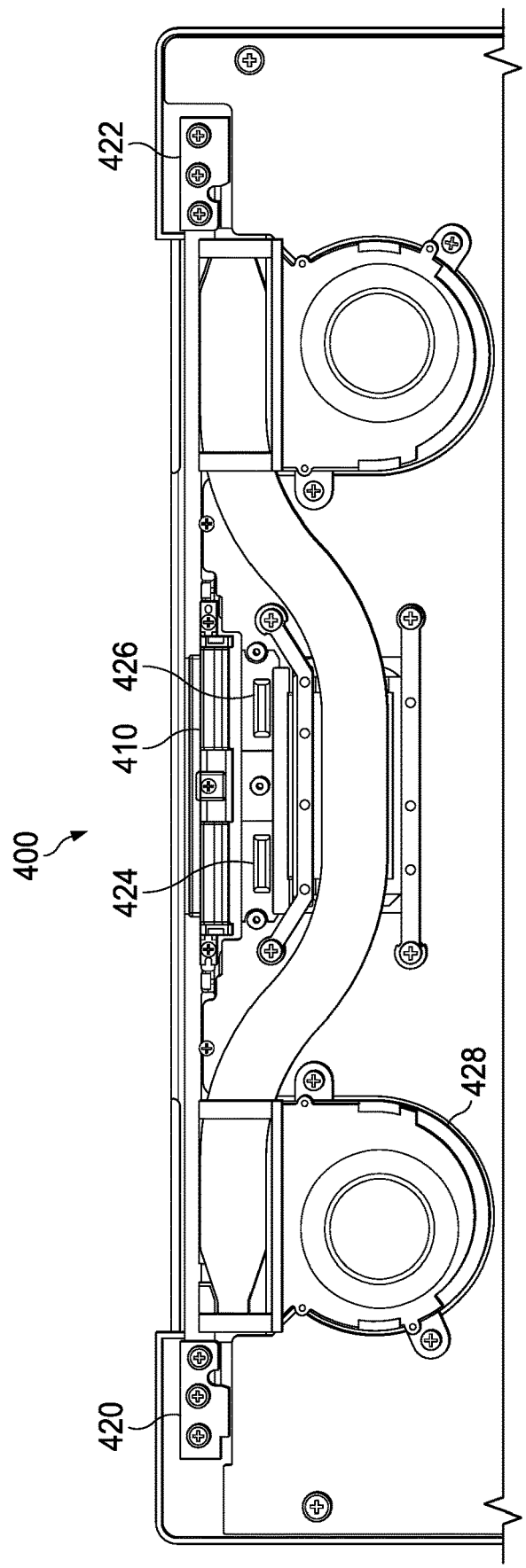
FIG. 4 shows a top view of a rear portion of a base chassis of a portable information handling system.

FIG. 4 shows a cut away bottom view of a rear portion of a base chassis 400 of a portable information handling system. More specifically, the rear portion of the base chassis 400 includes a cable routing bracket 410, a hinge 420 and a hinge 422. In certain embodiments, the base chassis includes a connector 424 and a connector 426. In certain embodiments, the base chassis includes a fan component 428. In certain embodiments, the cable routing bracket 410 is positioned between the hinge 420 and the hinge 422. In certain embodiments, the cable routing bracket is positioned at the center of the rear edge of the base chassis. In certain embodiments, connector 424 is positioned in line with a first cable routing portion of the cable routing bracket 410. In certain embodiments, connector 426 is positioned in line with a second cable routing portion of the cable routing bracket 410.

Figure 5:
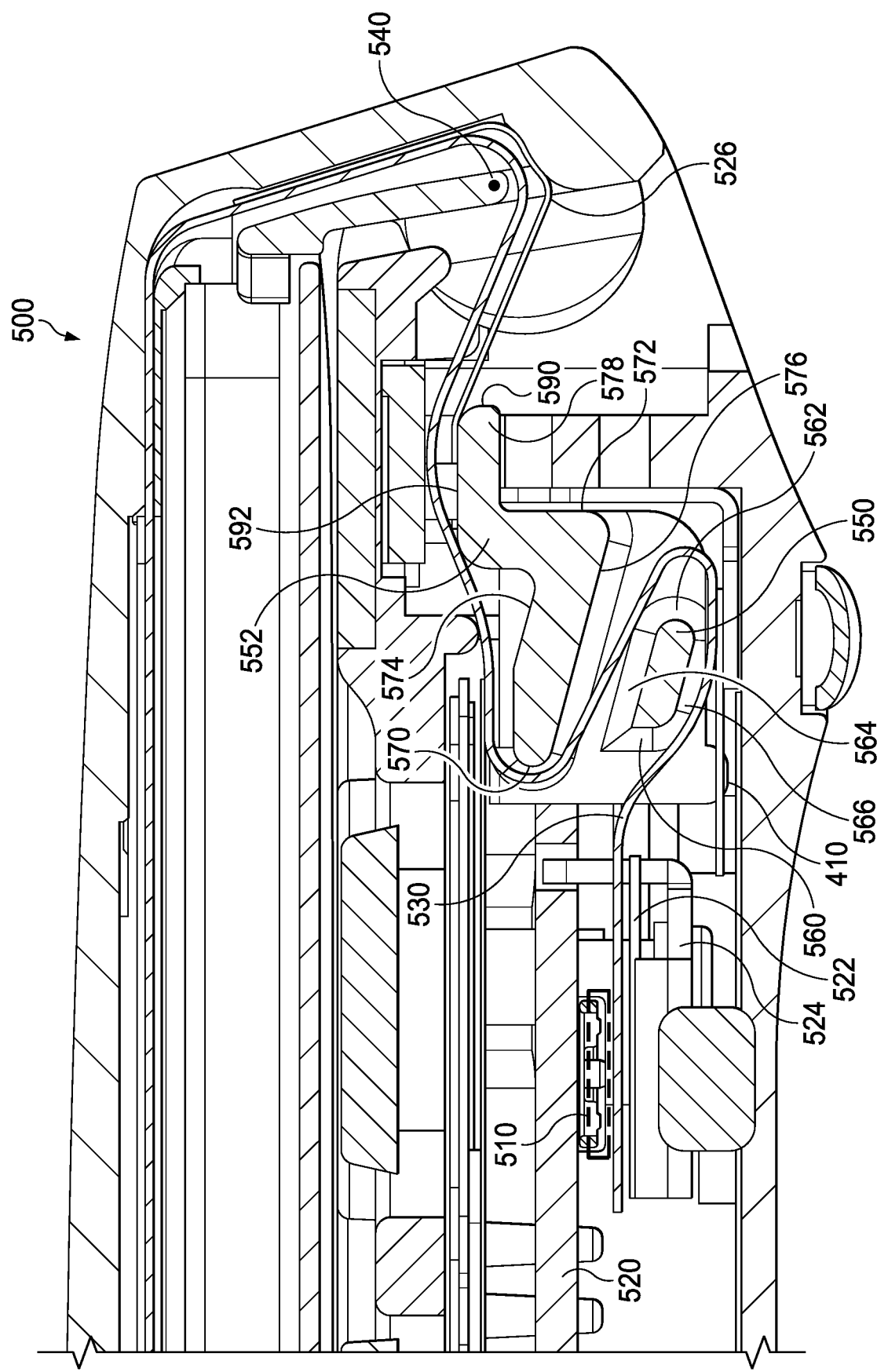
FIG. 5 shows a cross sectional view of a rear portion of a portable information handling system in a closed configuration.
Figure 6:
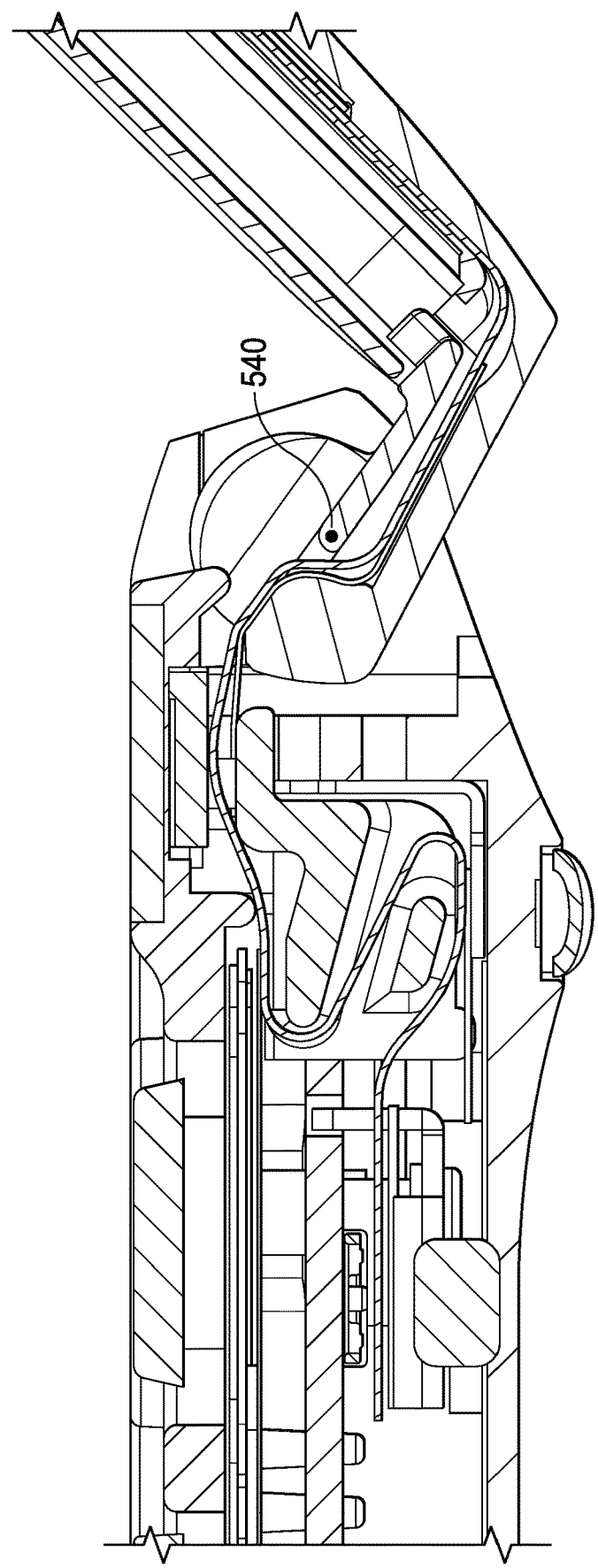
FIG. 6 shows a cross sectional view of a rear portion of a portable information handling system in an open configuration.

FIG. 5 shows a cross sectional view of a rear portion of a portable information handling system 500 in a closed configuration. FIG. 6 shows a cross section of a rear portion of a portable information handling system in an open configuration. The rear portion of the portable information handing system 500 includes the cable routing bracket 410 and a cable connector 510 positioned within a portion of a base chassis. The rear portion of the portable information handling system 500 also includes a portion of an information handling system motherboard 520. In certain embodiments, the cable connector 510 is mounted to the motherboard 520. The cable connector 510 provides electrical and structural connection with to motherboard.

In certain embodiments, the base chassis is rotationally coupled with the display chassis via one or more hinges (e.g., hinges 420, 422). In certain embodiments, the rear portion of the portable information handling system includes a cable support component 522 and a cable attachment component 524. In certain embodiments the cable support component 522 includes a metal stiffener on the cable behind the FPC connector for surface mount technology (SMT) and handling protection. In certain embodiments, the cable attachment component 524 includes a retention bracket (which is attached to the motherboard via screws) to prevent the connector pair from unmating. In certain embodiments, the rear portion of the portable information handling system includes a flexible cable protection component 526.

The rear portion of the portable information handling system 500 includes a cable 530. In certain embodiments, the cable 530 includes a flexible printed circuit (FPC) cable. In certain embodiments, the cable 530 includes a flexible portion and a non-flexible portion. The flexible portion corresponds to an area of the cable 530 that extends from where the cable exits the hingeup to the motherboard connector. In certain embodiments, the flexible portion is thinner than the non-flexible portion of the cable. In certain embodiments, the cable 530 includes one or both of a display control cable and a camera control cable. In certain embodiments, the cable 530 is connected between a component of the base chassis and a component of the display chassis. In certain embodiments, the cable 530 is connected between the motherboard 520 and a component of the display chassis. In certain embodiments, the component of the display chassis includes a display or a camera. In certain embodiments, the cable support component 522 and the cable attachment component 524 ensure the cable 530 is securely coupled to the motherboard 510 via the cable connector 510.

In certain embodiments, the cable 530 is routed through the cable mounting bracket 410. In certain embodiments, the cable routing bracket 410 causes the flexible printed circuit cable 530 to pivot about a hinge axis 540 of the hinge when the display chassis portion is rotated between an open configuration and a closed configuration. In certain embodiments, the cable routing bracket 410 includes a lower rib 550. In certain embodiments, the cable routing bracket 410 includes an upper rib 552. In certain embodiments, the flexible cable protection component 526 prevents external access to the cable 530 from a gap which is present is certain portions of the rear of portion of the portable information handling system between the base chassis and the display chassis. In certain embodiments, the flexible cable protection component 526 is physically connected from the cable routing bracket to the display chassis. In certain embodiments, the flexible cable protection component 526 pivots about the hinge axis 540 with the cable 530.

In certain embodiments, the lower rib 550 includes a forward facing edge 560, a rear facing edge 562, a top facing edge 564 and a bottom facing edge 566. The forward facing edge 560, the rear facing edge 562, the top facing edge 564 and the bottom facing edge 566 are designated as such with reference to a portable information handling system in which the base chassis is located on a flat horizontal surface. In certain embodiments, the upper rib 552 includes a forward facing edge 570, a rear facing edge 572, a top facing edge 574 and a bottom facing edge 576. In certain embodiments, the upper rib 552 includes a support protrusion 578 extending from the rear facing edge 572. The forward facing edge 570, the rear facing edge 572, the top facing edge 574, the bottom facing edge 576 and the support protrusion 576 are designated as such with reference to a portable information handling system in which the base chassis is located on a flat horizontal surface.

In certain embodiments, the rear facing edge 562 is curved to allow the cable 530 to wrap around the rear facing edge. In certain embodiments, the top facing edge 564 is slightly angled relative to horizontal. In certain embodiments, the top facing edge 564 is angled at 15 degrees (+/−20%) relative to horizontal. In certain embodiments, the bottom facing edge 566 is slightly angled relative to horizontal. In certain embodiments, the bottom facing edge 566 is angled at 15 degrees (+/−20%) relative to horizontal. In certain embodiments, angling the bottom facing edge 566 allows the cable routing bracket to guide the cable 530 to the connector 510. In certain embodiments, the horizontal dimension of the lower rib is smaller than the horizontal dimension of the upper rib to accommodate slack of the cable 530. In certain embodiments the horizontal dimension of the lower rib 550 is 40-60% smaller than the horizontal dimension of the upper rib 552 from its forward facing edge 570 to it rear facing edge 576.

In certain embodiments, the forward facing edge 570 is curved to allow the cable 530 to wrap around the forward facing edge. In certain embodiments, the top facing edge 574 includes a flat portion 580 and an angled portion 582. In certain embodiments, the angled portion 581 is slightly angled relative to horizontal. In certain embodiments, the flat portion 580 is flat relative (+/−20%) to horizontal and the angled portion 582 is angled at 15 degrees (+/−20%) relative to horizontal. In certain embodiments, the bottom facing edge 576 is slightly angled relative to horizontal. In certain embodiments, the bottom facing edge 566 is angled at 15 degrees (+/−20%) relative to horizontal. In certain embodiments, angling the bottom facing edge 566 allows the cable routing bracket to guide the cable 530 to the forward facing edge 570 from the rear facing edge 560 of the lower rib.

In certain embodiments, the support protrusion 578 includes a vertical portion 590 and a horizontal portion 592. In certain embodiments, the vertical portion 590 extends vertically from the angled portion 582 of the top facing edge 574. In certain embodiments, the horizontal portion extends perpendicularly from the vertical portion 590 of the support protrusion 578. In certain embodiments, the support protrusion 570 abuts an inside edge of the display chassis. In certain embodiments, abutting the support protrusion with the inside edge of the display chassis provides structural support for the cable routing bracket within the portable information handling system.

In certain embodiments, the lower rib 550 and upper rib 552 are vertically separated from each other by a predetermined distance 594. In certain embodiments, the predetermined distance is large enough to allow the cable 530 and any associated connection components (e.g., a connector, solder, etc.) to be fed between the low rib 550 and the upper rib 552 during assembly of the portable information handling system. In certain embodiments, the lower rib 550 and upper rib 552 are vertically separated from each other by 1.5 mm (+/−20%).

Figure 7:
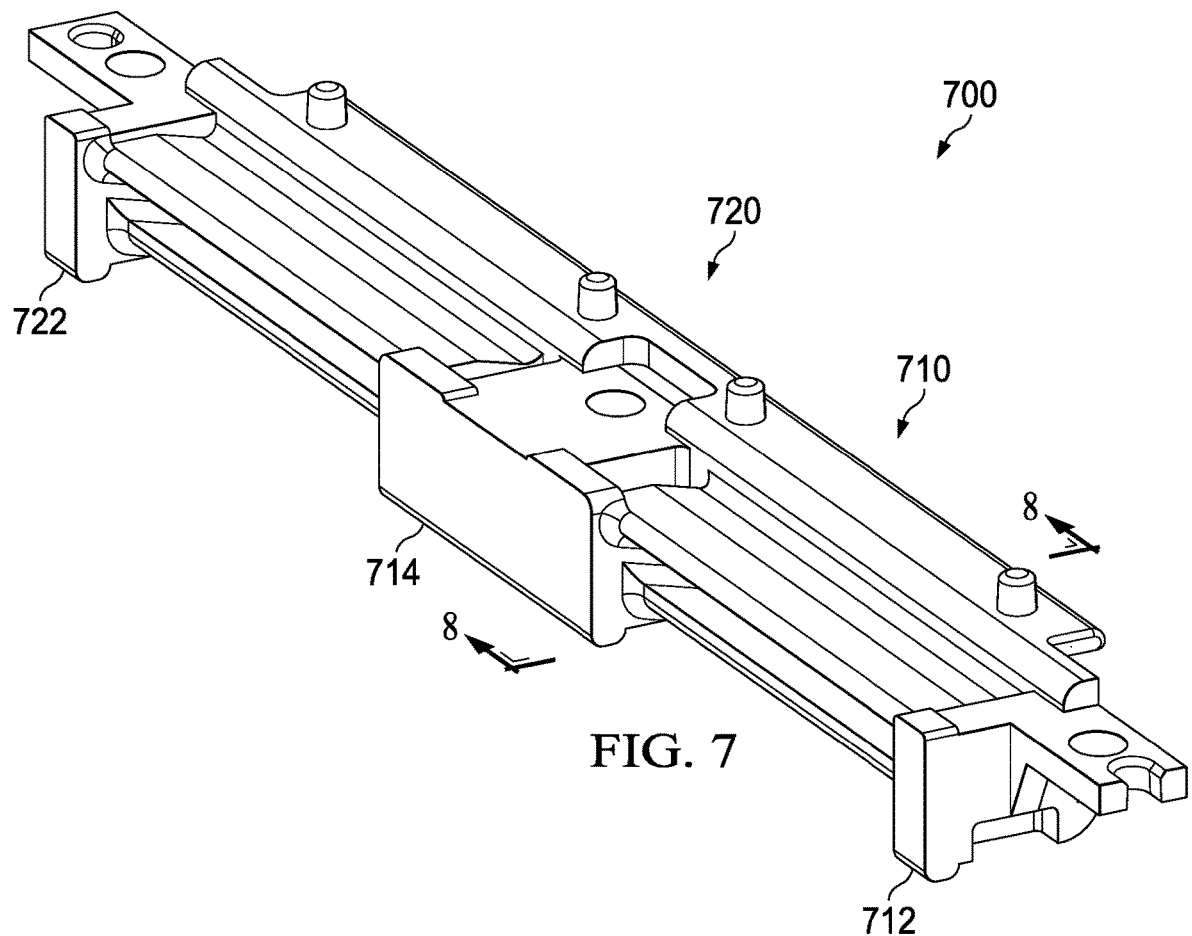
FIG. 7 shows a top perspective view of a cable routing bracket.
Figure 8:
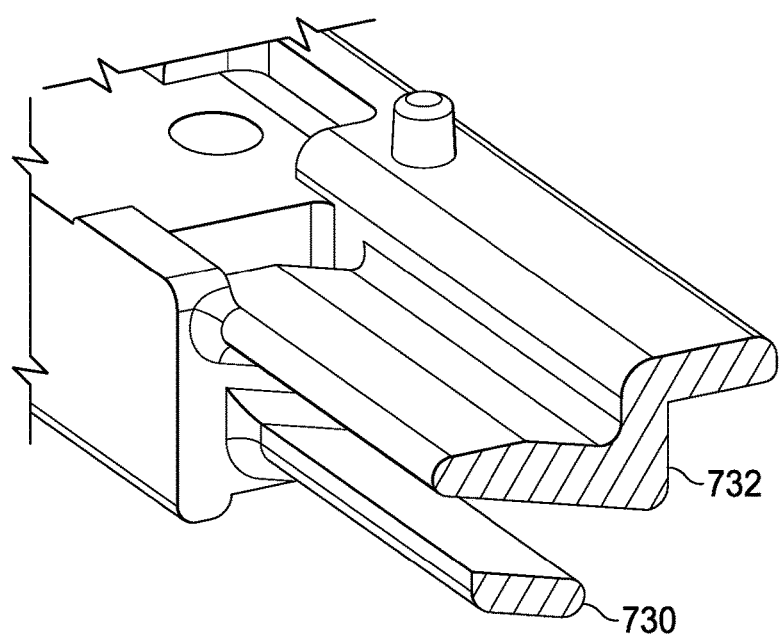
FIG. 8 shows a cross sectional perspective view of a cable routing bracket.
Figure 9:
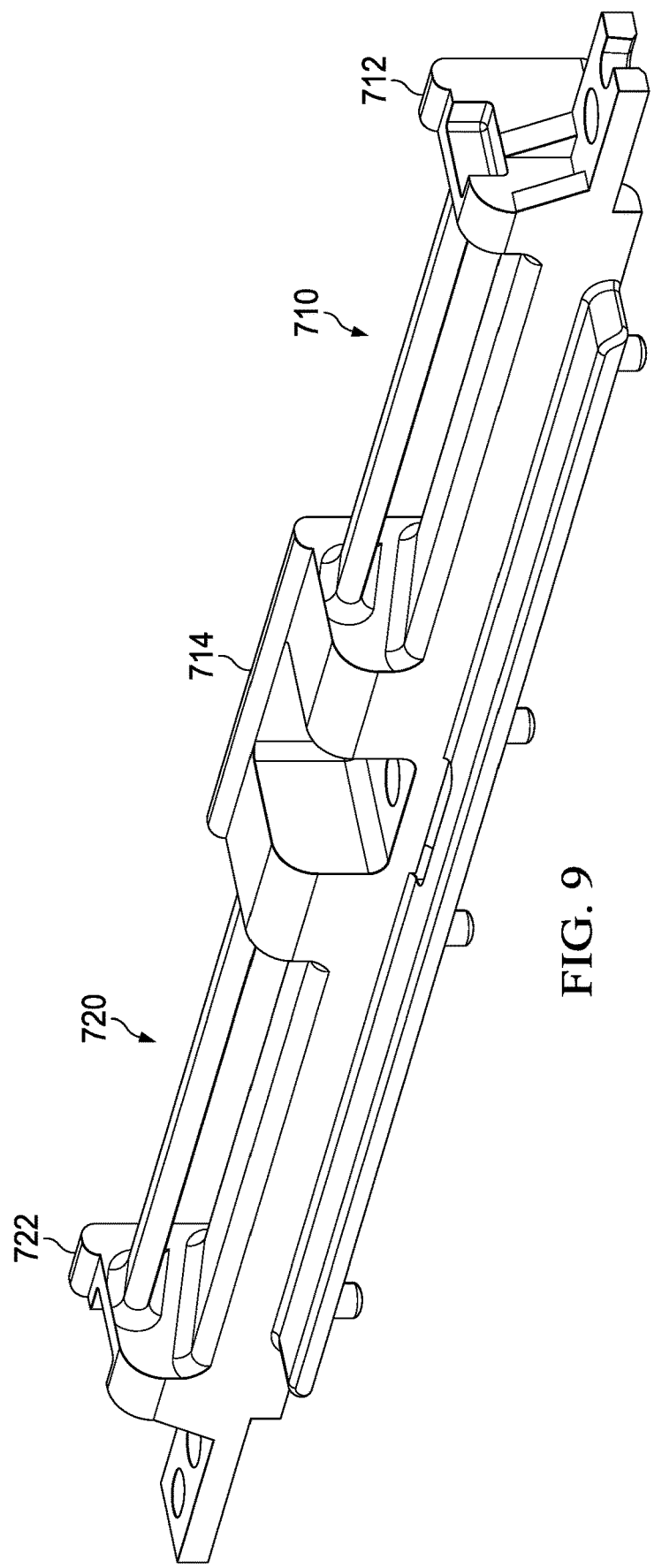
FIG. 9 shows a bottom perspective view of a cable routing bracket

FIG. 7 shows a top perspective view of a cable routing bracket 700. FIG. 8 shows a cross sectional perspective view of the cable routing bracket 700 with a cut away along the lines 8-8. FIG. 9 shows a bottom perspective view of the cable routing bracket 700. In certain embodiments, the cable routing bracket 700 includes a cable routing portion 710, a mounting portion 712 and a mounting portion 714. In certain embodiments, the cable mounting bracket 700 further includes another cable routing portion 720 and a mounting portion 722. In certain embodiments, the cable routing portion 710 and the cable routing portion 720 each include a lower rib 730 and an upper rib 732. In certain embodiments, the lower rib 730 corresponds to lower rib 550 and the upper rib 732 corresponds to upper rib 552. In certain embodiments, the cable mounting portion 710 is physically coupled between mounting portion 712 and mounting portion 714. In certain embodiments, some or all of mounting portion 712 and mounting portion 714 provide structural integrity to the lower rib 730 and the upper rib 732 of the cable routing portion 710. In certain embodiments, some or all of mounting portion 714 and mounting portion 722 provide structural integrity to the lower rib 730 and the upper rib 732 of the cable routing portion 720.

Figure 10:
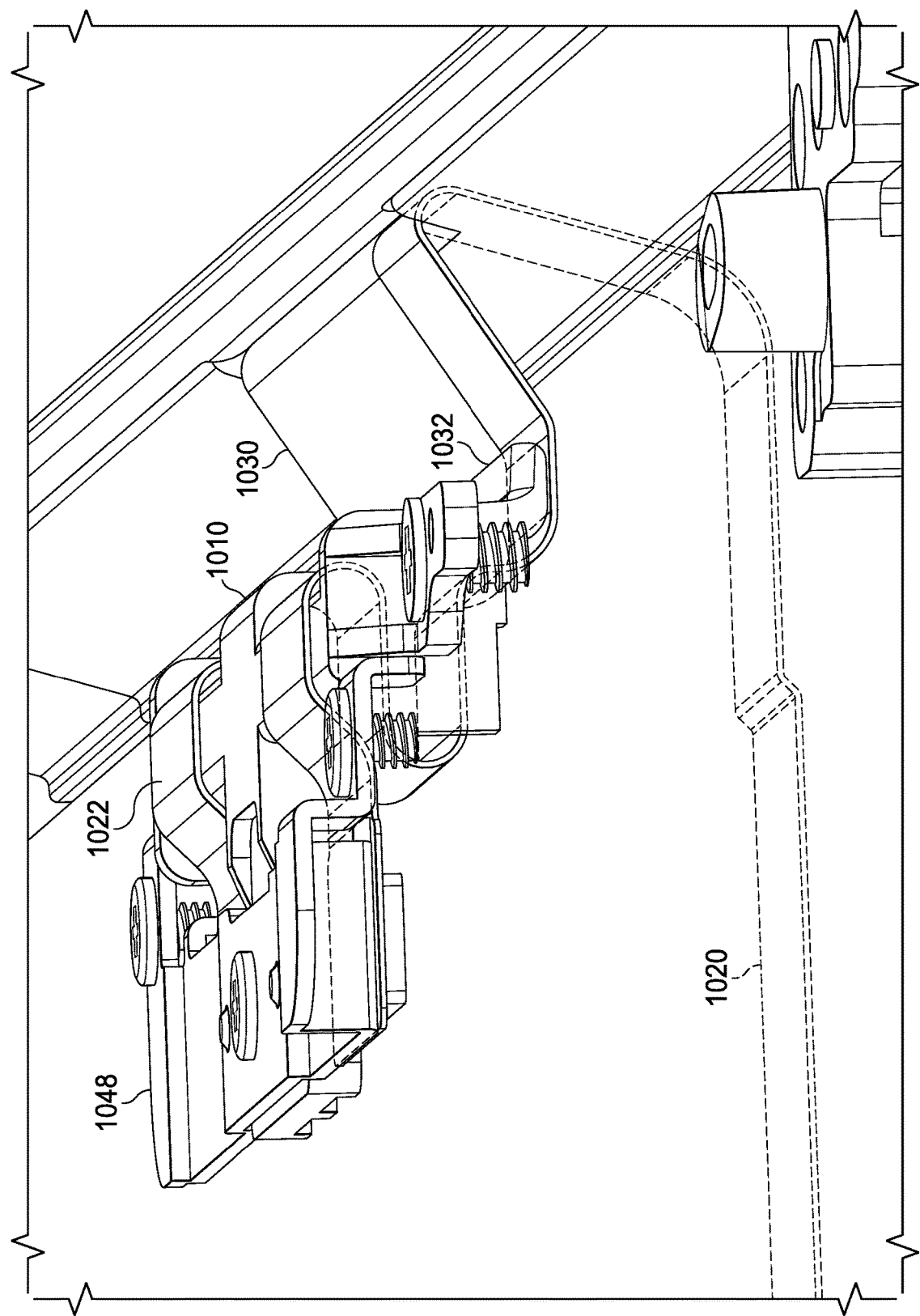
FIG. 10 shows a perspective view of a cable routing within a portable information handling system.

FIG. 10 shows a cut away perspective view 1000 of cable routing within a portable information handling system. More specifically, the portable information handling system includes a cable routing bracket 1010 and at least one of a cable 1020 and cable 1022. In certain embodiments, the cable routing bracket 1010 corresponds to cable routing bracket 410. In certain embodiments, cable 1020 corresponds to cable 530. In certain embodiments, cable 1022 corresponds to cable 530.

In certain embodiments, the portable information handling system includes a flexible cable protection component 1030. In certain embodiments, the flexible cable protection component 1030 corresponds to flexible cable protection component 526. In certain embodiments, the flexible cable protection component 1030 is mounted to the display chassis underneath the cable routing bracket 1010. In certain embodiments, an end of the flexible cable protection component 1030 is mounted to the display chassis underneath a support protrusion 1032 of the cable routing bracket 1010.

In certain embodiments, at least one of cable 1020 and cable 1022 are mounted to a motherboard of the portable information handling system via a cable attachment component 1040. In certain embodiments, the cable attachment component 1040 corresponds to cable attachment component 524.

Figure 11A:
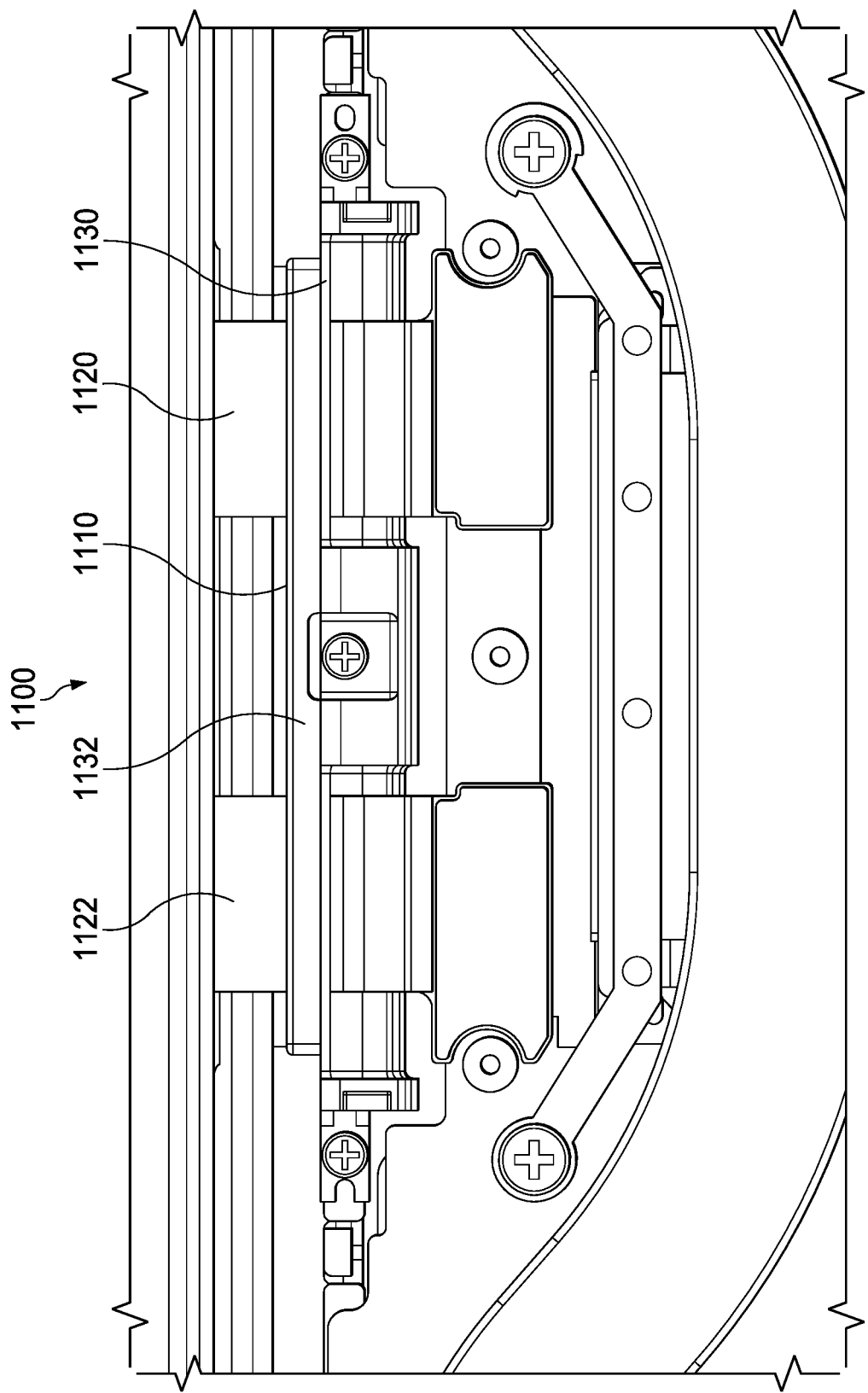
FIGS. 11A and 11B show top views of a cable routing bracket within a portable information handling system.
Figure 11B:
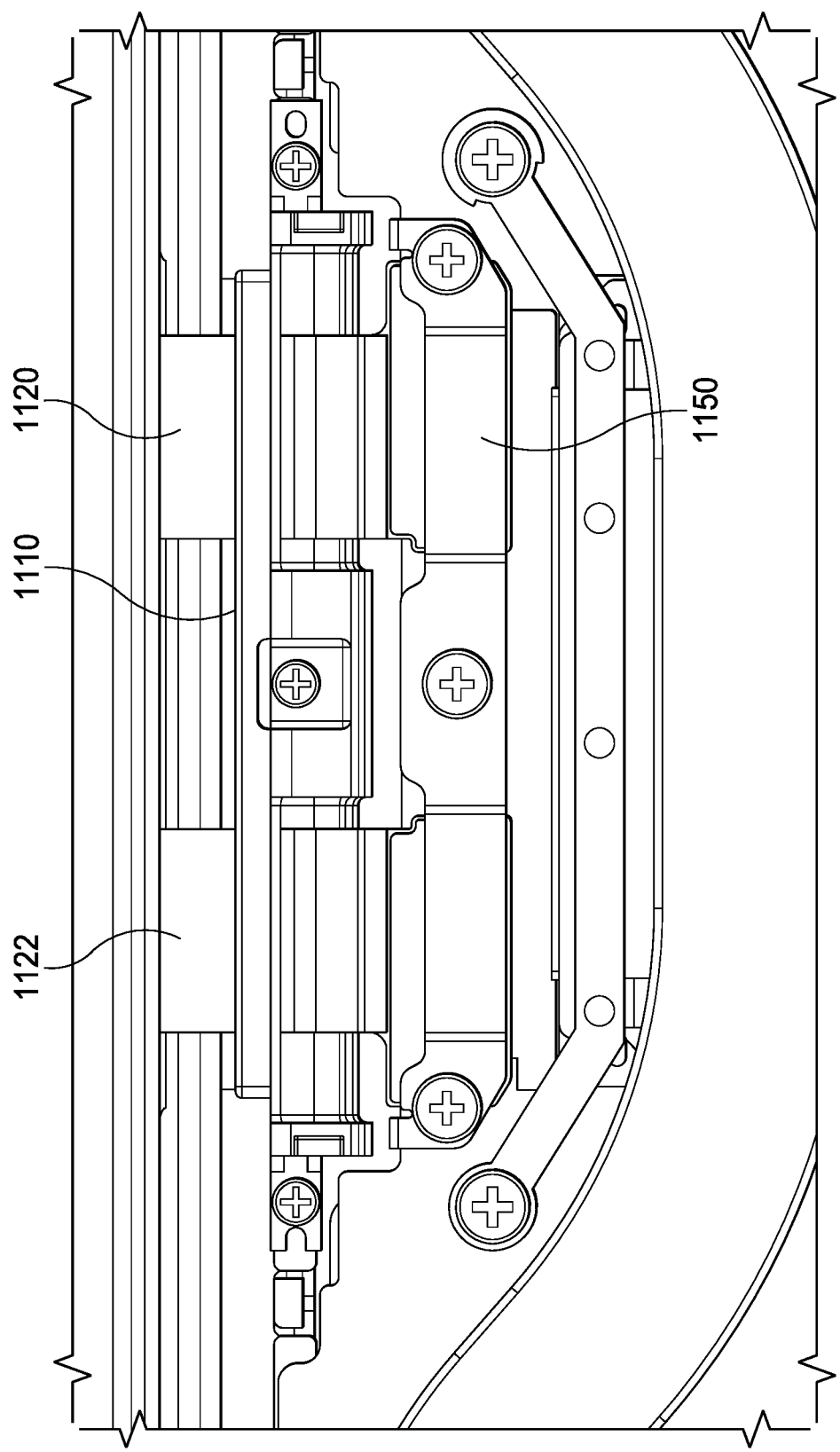

FIGS. 11A and 11B show top views of a cable routing 1100 within a portable information handling system. In certain embodiments, the cable routing is via a cable routing bracket 1110. In certain embodiments, the cable routing bracket 1110 corresponds to cable routing bracket 410. In certain embodiments, the cable routing bracket routes at least one of cable 1120 and cable 1122. In certain embodiments, the cable 1120 is routed via a cable routing portion 1130 of the cable routing bracket 1110. In certain embodiments, the cable 1122 is routed via a cable routing portion 1132 of the cable routing bracket 1110. In certain embodiments, cable routing portion 1130 corresponds to cable routing portion 710. In certain embodiments, cable routing portion 1132 corresponds to cable routing portion 712.

In certain embodiments, at least one of cable 1120 and cable 1122 are positioned under a cable support component 1140. In certain embodiments, the cable support component 1140 corresponds to cable support component 522. In certain embodiments, at least one of cable 1120 and cable 1122 is coupled to a motherboard of the portable information handling system via a cable attachment component 1150. In certain embodiments, the cable attachment component 1150 corresponds to cable attachment component 524.

Figure 12:
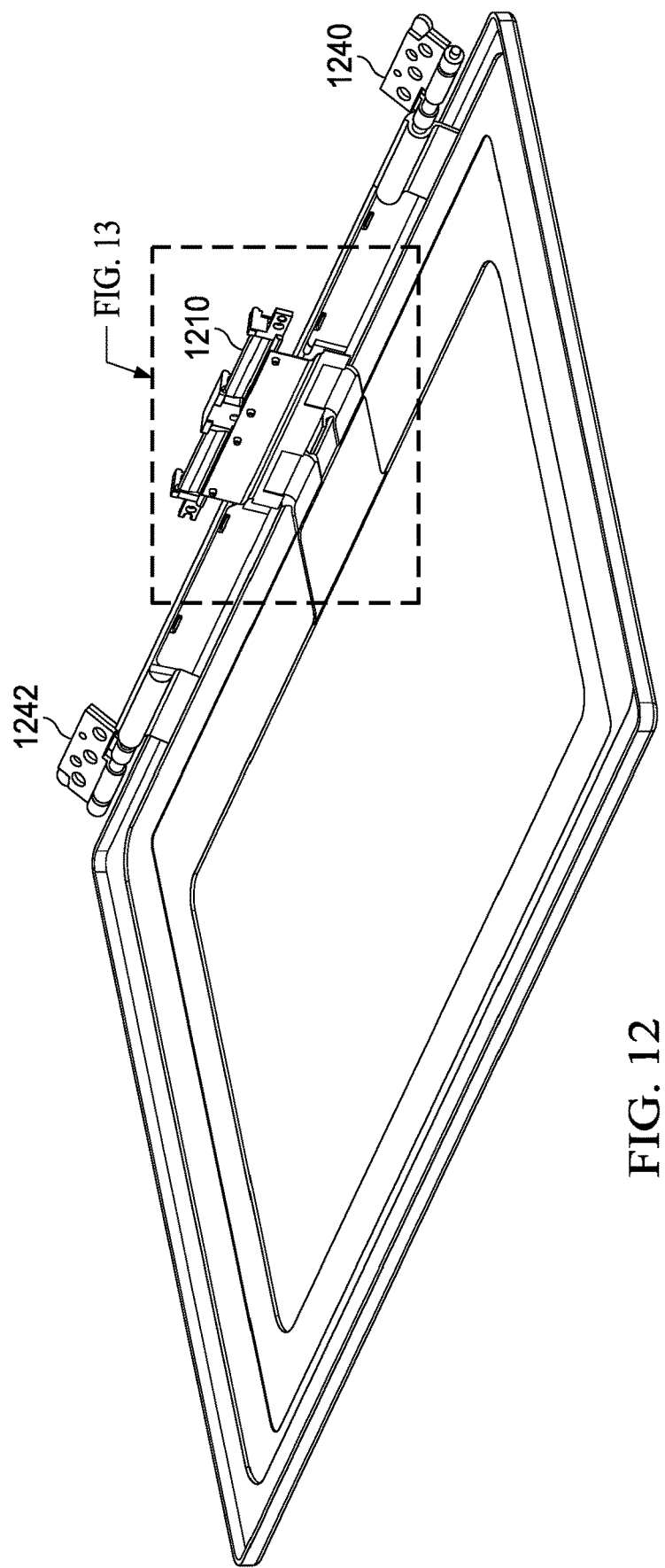
FIG. 12 shows a perspective view of a portion of a base chassis of a portable information handling system.
Figure 13:
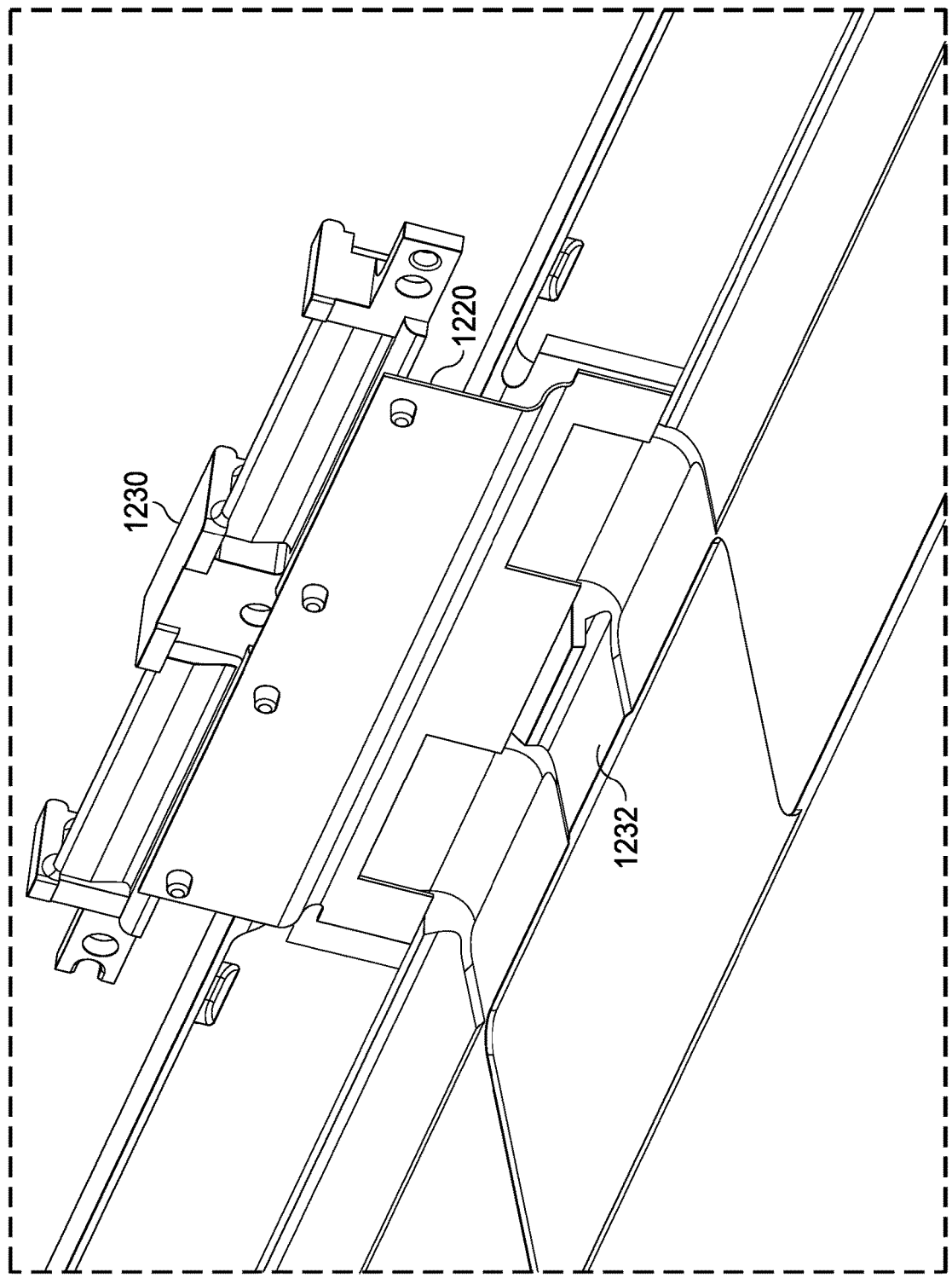
FIG. 13 shows an expanded perspective view of a portion of a base chassis of a portable information handling system.

FIG. 12 shows a diagrammatic perspective view of a portion of a base chassis of a portable information handling system. FIG. 13 shows an expanded diagrammatic perspective view of a portion of a base chassis of a portable information handling system. More specifically, FIGS. 12 and 13 show a representation of cable routing bracket 1210 physically connected to a display chassis via a flexible cable protection component 1220 before the cable routing backet attached 1210 to the display chassis. In certain embodiments, the flexible cable protection component 1220 corresponds to flexible cable protection component 526. After the cable routing bracket 1210 is connected to the display chassis via the flexible cable protection component 1220, the cable routing bracket 1210 is rotated such that surface 1230 abuts surface 1232. In certain embodiments, when the cable routing bracket is rotated, the flexible cable protection component 1220 wraps around a hinge axis of hinges 1240 and 1242.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A portable information handing system, comprising:
a base chassis portion, the base chassis portion comprising a motherboard, the base chassis portion comprising a cable routing bracket;
a display chassis portion, the display chassis portion being rotationally-coupled to the base chassis portion via a hinge, the hinge having a corresponding hinge axis, the display chassis portion comprising a display chassis component; and,
a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated; and wherein
the cable routing bracket comprises a lower rib; and,
the flexible printed circuit cable is fed through a bottom portion of the lower rib to a top portion of the lower rib, the lower rib providing the cable routing bracket with a slack portion, the slack portion receiving slack of the flexible printed circuit board cable.

2. The portable information handing system of claim 1, wherein:
the cable routing bracket comprises a plurality of cable routing portions, each of the plurality of cable routing portions routing a respective flexible printed circuit board cable.

3. The portable information handing system of claim 1, further comprising:
a cable attachment component, the cable attachment component coupling the flexible printed circuit board cable to the motherboard.

4. A portable information handing system, comprising:
a base chassis portion, the base chassis portion comprising a motherboard, the base chassis portion comprising a cable routing bracket;
a display chassis portion, the display chassis portion being rotationally-coupled to the base chassis portion via a hinge, the hinge having a corresponding hinge axis, the display chassis portion comprising a display chassis component; and,
a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated; and wherein
the cable routing bracket comprises an upper rib, the upper comprising a forward facing edge, the forward facing edge being curved to allow the flexible printed circuit board cable to wrap around the upper rib.

5. The portable information handing system of claim 4, wherein:
the upper rib comprises a cable support projection, the cable support projection directing the flexible printed circuit cable to pivot about the hinge axis when the display chassis portion is rotated.

6. An information handling system comprising:
a base chassis, the base chassis comprising a motherboard, the motherboard comprising a processor and a bus coupled to the processor, the base chassis portion comprising a cable routing bracket;
a display chassis, the display chassis being rotationally-coupled to the base chassis via a hinge, the hinge having a corresponding hinge axis, the display chassis comprising a display chassis component; and,
a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated; and wherein
the cable routing bracket comprises a lower rib; and,
the flexible printed circuit cable is fed through a bottom portion of the lower rib to a top portion of the lower rib, the lower rib providing the cable routing bracket with a slack portion, the slack portion receiving slack of the flexible printed circuit board cable.

7. An information handling system of claim 6, comprising:
a base chassis, the base chassis comprising a motherboard, the motherboard comprising a processor and a bus coupled to the processor, the base chassis portion comprising a cable routing bracket;
a display chassis, the display chassis being rotationally-coupled to the base chassis via a hinge, the hinge having a corresponding hinge axis, the display chassis comprising a display chassis component; and, a flexible printed circuit cable, the flexible printed circuit cable being coupled to the motherboard and the display chassis component, the flexible printed circuit cable being routed from the motherboard to the display chassis component via the cable routing bracket, the cable routing bracket causing the flexible printed circuit cable to pivot about the hinge axis of the hinge when the display chassis portion is rotated; and wherein the cable routing bracket comprises an upper rib, the upper comprising a forward facing edge, the forward facing edge being curved to allow the flexible printed circuit board cable to wrap around the upper rib.

8. The information handling system of claim 7, wherein:
the upper rib comprises a cable support projection, the cable support projection directing the flexible printed circuit cable to pivot about the hinge axis when the display chassis portion is rotated.

9. The information handling system of claim 6, wherein:
the cable routing bracket comprises a plurality of cable routing portions, each of the plurality of cable routing portions routing a respective flexible printed circuit board cable.

10. The information handling system of claim 6, further comprising:
a cable attachment component, the cable attachment component coupling the flexible printed circuit board cable to the motherboard.

11. A cable routing bracket, comprising:
a cable routing portion, the cable routing portion routing a cable from a base chassis of an information handling system to a display chassis of an information handling system, the base chassis and the display chassis being rotationally-coupled via a hinge, the cable routing portion causing the cable to pivot about the hinge axis of the hinge when the display chassis is rotated about the hinge; and wherein the cable routing portion comprises a lower rib; and,
the cable is fed through a bottom portion of the lower rib to a top portion of the lower rib, the lower rib providing the cable routing portion with a slack portion, the slack portion receiving slack of the flexible printed circuit board cable.

12. A cable routing bracket of claim 11, comprising wherein:
a cable routing portion, the cable routing portion routing a cable from a base chassis of an information handling system to a display chassis of an information handling system, the base chassis and the display chassis being rotationally-coupled via a hinge, the cable routing portion causing the cable to pivot about the hinge axis of the hinge when the display chassis is rotated about the hinge; and wherein the cable routing portion comprises an upper rib, the upper comprising a forward facing edge, the forward facing edge being curved to allow the flexible printed circuit board cable to wrap around the upper rib.

13. The cable routing bracket of claim 12, wherein:
the upper rib comprises a cable support projection, the cable support projection directing the cable to pivot about the hinge axis when the display chassis portion is rotated.

14. The cable routing bracket of claim 11, wherein:
the cable routing bracket comprises a plurality of cable routing portions, each of the plurality of cable routing portions routing a respective board cable.

* * * * *